(12) United States Patent
Gardner

(10) Patent No.: US 12,045,212 B2
(45) Date of Patent: Jul. 23, 2024

(54) SYSTEMS, METHODS, AND APPARATUSES FOR VERIFYING ENTRIES IN DISPARATE DATABASES

(71) Applicant: CDK GLOBAL, LLC, Hoffman Estates, OR (US)

(72) Inventor: Craig Gardner, Portland, OR (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 0 days.

(21) Appl. No.: 17/237,587

(22) Filed: Apr. 22, 2021

(65) Prior Publication Data

US 2022/0342859 A1 Oct. 27, 2022

(51) Int. Cl.
| | |
|---|---|
| G06F 16/215 | (2019.01) |
| G06F 16/178 | (2019.01) |
| G06F 16/21 | (2019.01) |
| G06F 16/25 | (2019.01) |
| G06F 16/27 | (2019.01) |

(52) U.S. Cl.
CPC ........ *G06F 16/215* (2019.01); *G06F 16/1794* (2019.01); *G06F 16/214* (2019.01); *G06F 16/258* (2019.01); *G06F 16/27* (2019.01); *G06F 16/273* (2019.01); *G06F 16/275* (2019.01); *G06F 16/278* (2019.01)

(58) Field of Classification Search
CPC ...... G06F 16/215; G06F 16/27; G06F 16/214; G06F 16/258; G06F 16/273; G06F 16/275; G06F 16/278; G06F 16/1794
See application file for complete search history.

(56) References Cited

U.S. PATENT DOCUMENTS

| | | |
|---|---|---|
| 3,792,445 A | 2/1974 | Bucks et al. |
| 4,258,421 A | 3/1981 | Juhasz et al. |
| 4,992,940 A | 2/1991 | Dworkin |
| 5,003,476 A | 3/1991 | Abe |
| 5,034,889 A | 7/1991 | Abe |
| 5,058,044 A | 10/1991 | Stewart et al. |
| 5,421,015 A | 5/1995 | Khoyi et al. |
| 5,442,553 A | 8/1995 | Parrillo |
| 5,452,446 A | 9/1995 | Johnson |
| 5,521,815 A | 5/1996 | Rose, Jr. |
| 5,649,186 A | 7/1997 | Ferguson |

(Continued)

FOREIGN PATENT DOCUMENTS

| | | |
|---|---|---|
| CA | 2494350 | 5/2004 |
| EP | 0461888 | 3/1995 |
| WO | 2007002759 | 1/2007 |

OTHER PUBLICATIONS

Bedell, Doug, Dallas Morning News, "I Know Someone Who Knows Kevin Bacon". Oct. 27, 1998. 4 pgs.

(Continued)

*Primary Examiner* — Kris E Mackes
*Assistant Examiner* — Lin Lin M Htay
(74) *Attorney, Agent, or Firm* — Stoel Rives LLP

(57) ABSTRACT

Embodiments herein relate to replacing a legacy Pick environment with a modern microservice architecture. A legacy database and a modern database may be operated in parallel for data validation. Part of the data validation may include verifying that changes to a business object that are entered on the legacy Pick environment are similarly entered by the modern microservice architecture.

20 Claims, 4 Drawing Sheets

(56) References Cited

U.S. PATENT DOCUMENTS

| | | |
|---|---|---|
| 5,694,595 A | 12/1997 | Jacobs et al. |
| 5,729,452 A | 3/1998 | Smith et al. |
| 5,764,943 A | 6/1998 | Wechsler |
| 5,787,177 A | 7/1998 | Leppek |
| 5,790,785 A | 8/1998 | Klug et al. |
| 5,835,712 A | 11/1998 | Dufresne |
| 5,845,299 A | 12/1998 | Arora et al. |
| 5,862,346 A | 1/1999 | Kley et al. |
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | Lemole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,181,994 B1 | 1/2001 | Colson et al. |
| 6,185,614 B1 | 2/2001 | Cuomo et al. |
| 6,189,104 B1 | 2/2001 | Leppek |
| 6,216,129 B1 | 4/2001 | Eldering |
| 6,219,667 B1 | 4/2001 | Lu et al. |
| 6,236,994 B1 | 5/2001 | Schwartz et al. |
| 6,240,365 B1 | 5/2001 | Bunn |
| 6,263,268 B1 | 7/2001 | Nathanson |
| 6,285,932 B1 | 9/2001 | De Bellefeuille et al. |
| 6,289,382 B1 | 9/2001 | Bowman-Amuah |
| 6,295,061 B1 | 9/2001 | Park et al. |
| 6,330,499 B1 | 12/2001 | Chou et al. |
| 6,343,302 B1 | 1/2002 | Graham |
| 6,353,824 B1 | 3/2002 | Boguraev et al. |
| 6,356,822 B1 | 3/2002 | Diaz et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,106 B1 | 1/2003 | Lawrence et al. |
| 6,505,205 B1 | 1/2003 | Kothuri et al. |
| 6,519,617 B1 | 2/2003 | Wanderski et al. |
| 6,529,948 B1 | 3/2003 | Bowman-Amuah |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,640,244 B1 | 10/2003 | Bowman-Amuah et al. |
| 6,643,663 B1 | 11/2003 | Dabney et al. |
| 6,654,726 B1 | 11/2003 | Hanzek |
| 6,674,805 B1 | 1/2004 | Kovacevic et al. |
| 6,678,706 B1 | 1/2004 | Fishel |
| 6,697,825 B1 | 2/2004 | Underwood et al. |
| 6,701,232 B2 | 3/2004 | Yamaki |
| 6,721,747 B2 | 4/2004 | Lipkin |
| 6,728,685 B1 | 4/2004 | Ahluwalia |
| 6,738,750 B2 | 5/2004 | Stone et al. |
| 6,744,735 B1 | 6/2004 | Nakaguro |
| 6,748,305 B1 | 6/2004 | Klausner et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,850,823 B2 | 2/2005 | Eun et al. |
| 6,871,216 B2 | 3/2005 | Miller et al. |
| 6,901,430 B1 | 3/2005 | Smith |
| 6,894,601 B1 | 5/2005 | Grunden et al. |
| 6,917,941 B2 | 7/2005 | Wight et al. |
| 6,922,674 B1 | 7/2005 | Nelson |
| 6,941,203 B2 | 9/2005 | Chen |
| 6,944,677 B1 | 9/2005 | Zhao |
| 6,954,731 B1 | 10/2005 | Montague et al. |
| 6,963,854 B1 | 11/2005 | Boyd et al. |
| 6,965,806 B2 | 11/2005 | Eryurek et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 6,993,421 B2 | 1/2006 | Pillar |
| 7,000,184 B2 | 2/2006 | Matveyenko et al. |
| 7,003,476 B1 | 2/2006 | Samra et al. |
| 7,010,495 B1 | 3/2006 | Samra et al. |
| 7,028,072 B1 | 4/2006 | Kliger et al. |
| 7,031,554 B2 | 4/2006 | Iwane |
| 7,039,704 B2 | 5/2006 | Davis et al. |
| 7,047,318 B1 | 5/2006 | Svedloff |
| 7,062,343 B2 | 6/2006 | Ogushi et al. |
| 7,062,506 B2 | 6/2006 | Taylor et al. |
| 7,072,943 B2 | 7/2006 | Landesmann |
| 7,092,803 B2 | 8/2006 | Kapolka et al. |
| 7,107,268 B1 | 9/2006 | Zawadzki et al. |
| 7,124,116 B2 | 10/2006 | Huyler |
| 7,152,207 B1 | 12/2006 | Underwood et al. |
| 7,155,491 B1 | 12/2006 | Schultz et al. |
| 7,171,418 B2 | 1/2007 | Blessin |
| 7,184,866 B2 | 2/2007 | Squires et al. |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,287,000 B2 | 10/2007 | Boyd et al. |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,406,429 B2 | 7/2008 | Salonen |
| 7,433,891 B2 | 10/2008 | Haber et al. |
| 7,457,693 B2 | 11/2008 | Olsen et al. |
| 7,477,968 B1 | 1/2009 | Lowrey |
| 7,480,551 B1 | 1/2009 | Lowrey et al. |
| 7,496,543 B1 | 2/2009 | Bamford et al. |
| 7,502,672 B1 | 3/2009 | Kolls |
| 7,536,641 B2 | 5/2009 | Rosenstein et al. |
| 7,548,985 B2 | 6/2009 | Guigui |
| 7,587,504 B2 | 9/2009 | Adams et al. |
| 7,590,476 B2 | 9/2009 | Shumate |
| 7,593,925 B2 | 9/2009 | Cadiz et al. |
| 7,593,999 B2 | 9/2009 | Nathanson |
| 7,613,627 B2 | 11/2009 | Doyle et al. |
| 7,620,484 B1 | 11/2009 | Chen |
| 7,624,342 B2 | 11/2009 | Matveyenko et al. |
| 7,657,594 B2 | 2/2010 | Banga et al. |
| 7,664,667 B1 | 2/2010 | Ruppelt et al. |
| 7,739,007 B2 | 6/2010 | Logsdon |
| 7,747,680 B2 | 6/2010 | Ravikumar et al. |
| 7,778,841 B1 | 8/2010 | Bayer et al. |
| 7,801,945 B1 | 9/2010 | Geddes et al. |
| 7,818,380 B2 | 10/2010 | Tamura et al. |
| 7,861,309 B2 | 12/2010 | Spearman et al. |
| 7,865,409 B1 | 1/2011 | Monaghan |

(56) References Cited

U.S. PATENT DOCUMENTS

| | | |
|---|---|---|
| 7,870,253 B2 | 1/2011 | Muilenburg et al. |
| 7,899,701 B1 | 3/2011 | Odom |
| 7,908,051 B2 | 3/2011 | Oesterling |
| 7,979,506 B2 | 7/2011 | Cole |
| 8,010,423 B2 | 8/2011 | Bodin et al. |
| 8,019,501 B2 | 9/2011 | Breed |
| 8,036,788 B2 | 10/2011 | Breed |
| 8,051,159 B2 | 11/2011 | Muilenburg et al. |
| 8,055,544 B2 | 11/2011 | Ullman et al. |
| 8,060,274 B2 | 11/2011 | Boss et al. |
| 8,095,403 B2 | 1/2012 | Price |
| 8,099,308 B2 | 1/2012 | Uyeki |
| 8,135,804 B2 | 3/2012 | Uyeki |
| 8,145,379 B2 | 3/2012 | Schwinke |
| 8,190,322 B2 | 5/2012 | Lin et al. |
| 8,209,259 B2 | 6/2012 | Graham, Jr. et al. |
| 8,212,667 B2 | 7/2012 | Petite et al. |
| 8,271,473 B2 | 9/2012 | Berg |
| 8,271,547 B2 | 9/2012 | Taylor et al. |
| 8,275,717 B2 | 9/2012 | Ullman et al. |
| 8,285,439 B2 | 10/2012 | Hodges |
| 8,296,007 B2 | 10/2012 | Swaminathan et al. |
| 8,311,905 B1 | 11/2012 | Campbell et al. |
| 8,355,950 B2 | 1/2013 | Colson et al. |
| 8,407,664 B2 | 3/2013 | Moosmann et al. |
| 8,428,815 B2 | 4/2013 | Van Engelshoven et al. |
| 8,438,310 B2 | 5/2013 | Muilenburg et al. |
| 8,448,057 B1 | 5/2013 | Sugnet |
| 8,521,654 B2 | 8/2013 | Ford et al. |
| 8,538,894 B2 | 9/2013 | Ullman et al. |
| 8,645,193 B2 | 2/2014 | Swinson et al. |
| 8,676,638 B1 | 3/2014 | Blair et al. |
| 8,725,341 B2 | 5/2014 | Ogasawara |
| 8,745,641 B1 | 6/2014 | Coker |
| 8,849,689 B1 | 9/2014 | Jagannathan et al. |
| 8,886,389 B2 | 11/2014 | Edwards et al. |
| 8,924,071 B2 | 12/2014 | Stanek et al. |
| 8,954,222 B2 | 2/2015 | Costantino |
| 8,996,230 B2 | 3/2015 | Lorenz et al. |
| 8,996,235 B2 | 3/2015 | Singh et al. |
| 9,014,908 B2 | 4/2015 | Chen et al. |
| 9,015,059 B2 | 4/2015 | Sims et al. |
| 9,026,304 B2 | 5/2015 | Olsen, III et al. |
| 9,047,722 B2 | 6/2015 | Kurnik et al. |
| 9,122,716 B1 | 9/2015 | Naganathan et al. |
| 9,165,413 B2 | 10/2015 | Jones et al. |
| 9,183,681 B2 | 11/2015 | Fish |
| 9,325,650 B2 | 4/2016 | Yalavarty et al. |
| 9,349,223 B1 | 5/2016 | Palmer |
| 9,384,597 B2 | 7/2016 | Koch et al. |
| 9,455,969 B1 * | 9/2016 | Cabrera ............... H04L 63/08 |
| 9,477,936 B2 | 10/2016 | Lawson et al. |
| 9,577,866 B2 | 2/2017 | Rogers et al. |
| 9,596,287 B2 | 3/2017 | Rybak et al. |
| 9,619,945 B2 | 4/2017 | Adderly et al. |
| 9,659,495 B2 | 5/2017 | Modica et al. |
| 9,706,008 B2 | 7/2017 | Rajan et al. |
| 9,715,665 B2 | 7/2017 | Schondorf et al. |
| 9,754,304 B2 | 9/2017 | Taira et al. |
| 9,778,045 B2 | 10/2017 | Bang |
| 9,836,714 B2 | 12/2017 | Lander et al. |
| 9,983,982 B1 | 3/2018 | Kumar et al. |
| 10,032,139 B2 | 7/2018 | Adderly et al. |
| 10,083,411 B2 | 9/2018 | Kinsey et al. |
| 10,169,607 B1 | 1/2019 | Sheth et al. |
| 10,229,394 B1 | 3/2019 | Davis et al. |
| 10,448,120 B1 | 10/2019 | Bursztyn et al. |
| 10,475,256 B2 | 11/2019 | Chowdhury et al. |
| 10,509,696 B1 | 12/2019 | Gilderman et al. |
| 10,541,938 B1 | 1/2020 | Timmerman et al. |
| 10,552,871 B1 | 2/2020 | Chadwick |
| 10,657,707 B1 | 5/2020 | Leise |
| 11,080,105 B1 | 8/2021 | Birkett et al. |
| 11,117,253 B2 | 9/2021 | Oleynik |
| 11,190,608 B2 | 11/2021 | Amar et al. |
| 11,282,041 B2 | 3/2022 | Sanderford et al. |
| 11,322,247 B2 | 5/2022 | Bullington et al. |
| 11,392,855 B1 | 7/2022 | Murakonda et al. |
| 11,443,275 B1 | 9/2022 | Prakash et al. |
| 11,468,089 B1 | 10/2022 | Bales et al. |
| 11,507,892 B1 | 11/2022 | Henckel et al. |
| 2001/0005831 A1 | 6/2001 | Lewin et al. |
| 2001/0014868 A1 | 8/2001 | Herz et al. |
| 2001/0037332 A1 | 11/2001 | Miller et al. |
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1 | 2/2002 | Jones et al. |
| 2002/0026359 A1 | 2/2002 | Long et al. |
| 2002/0032626 A1 | 3/2002 | Dewolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0052778 A1 | 5/2002 | Murphy et al. |
| 2002/0059260 A1 | 5/2002 | Jas |
| 2002/0065698 A1 | 5/2002 | Schick et al. |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1 | 8/2002 | Vanstory et al. |
| 2002/0111844 A1 | 8/2002 | Vanstory et al. |
| 2002/0116197 A1 | 8/2002 | Erten |
| 2002/0116418 A1 | 8/2002 | Lachhwani et al. |
| 2002/0123359 A1 | 9/2002 | Wei et al. |
| 2002/0124053 A1 | 9/2002 | Adams et al. |
| 2002/0128728 A1 | 9/2002 | Murakami et al. |
| 2002/0129054 A1 | 9/2002 | Ferguson et al. |
| 2002/0133273 A1 | 9/2002 | Lowrey et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0173885 A1 | 11/2002 | Lowrey et al. |
| 2002/0188869 A1 | 12/2002 | Patrick |
| 2002/0196273 A1 | 12/2002 | Krause |
| 2002/0198761 A1 | 12/2002 | Ryan et al. |
| 2002/0198878 A1 | 12/2002 | Baxter et al. |
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1 | 2/2003 | Kokes et al. |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0055666 A1 | 3/2003 | Roddy et al. |
| 2003/0061263 A1 | 3/2003 | Riddle |
| 2003/0065532 A1 | 4/2003 | Takaoka |
| 2003/0065583 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0095038 A1 | 5/2003 | Dix |
| 2003/0101262 A1 | 5/2003 | Godwin |
| 2003/0115292 A1 | 6/2003 | Griffin et al. |
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0093243 A1 | 5/2004 | Bodin et al. |
| 2004/0117046 A1 | 6/2004 | Colle et al. |

(56) References Cited

U.S. PATENT DOCUMENTS

| | | |
|---|---|---|
| 2004/0122735 A1 | 6/2004 | Meshkin et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |
| 2004/0199413 A1 | 10/2004 | Hauser et al. |
| 2004/0220863 A1 | 11/2004 | Porter et al. |
| 2004/0225664 A1 | 11/2004 | Casement |
| 2004/0230897 A1 | 11/2004 | Latzel |
| 2004/0255233 A1 | 12/2004 | Croney et al. |
| 2004/0267263 A1 | 12/2004 | May |
| 2004/0268225 A1 | 12/2004 | Walsh et al. |
| 2004/0268232 A1 | 12/2004 | Tunning |
| 2005/0015491 A1 | 1/2005 | Koeppel |
| 2005/0021197 A1 | 1/2005 | Zimmerman et al. |
| 2005/0027611 A1 | 2/2005 | Wharton |
| 2005/0043614 A1 | 2/2005 | Huizenga et al. |
| 2005/0065804 A1 | 3/2005 | Worsham et al. |
| 2005/0096963 A1 | 5/2005 | Myr et al. |
| 2005/0108112 A1 | 5/2005 | Ellenson et al. |
| 2005/0114270 A1 | 5/2005 | Hind et al. |
| 2005/0114764 A1 | 5/2005 | Gudenkauf et al. |
| 2005/0108637 A1 | 6/2005 | Sahota et al. |
| 2005/0149398 A1 | 7/2005 | McKay |
| 2005/0171836 A1 | 8/2005 | Leacy |
| 2005/0176482 A1 | 8/2005 | Raisinghani et al. |
| 2005/0187834 A1 | 8/2005 | Painter et al. |
| 2005/0198121 A1 | 9/2005 | Daniels et al. |
| 2005/0228736 A1 | 10/2005 | Norman et al. |
| 2005/0256755 A1 | 11/2005 | Chand et al. |
| 2005/0267774 A1 | 12/2005 | Merritt et al. |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0004725 A1 | 1/2006 | Abraido-Fandino |
| 2006/0031811 A1 | 2/2006 | Ernst et al. |
| 2006/0059253 A1 | 3/2006 | Goodman et al. |
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0136105 A1 | 6/2006 | Larson |
| 2006/0161841 A1 | 7/2006 | Horiuchi et al. |
| 2006/0200751 A1 | 9/2006 | Underwood et al. |
| 2006/0224447 A1 | 10/2006 | Koningstein |
| 2006/0248205 A1* | 11/2006 | Randle ............... H04L 63/0869 709/229 |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2006/0282328 A1 | 12/2006 | Gerace et al. |
| 2006/0282547 A1 | 12/2006 | Hasha et al. |
| 2007/0005446 A1 | 1/2007 | Fusz et al. |
| 2007/0016486 A1 | 1/2007 | Stone et al. |
| 2007/0027754 A1 | 2/2007 | Collins et al. |
| 2007/0033087 A1 | 2/2007 | Combs et al. |
| 2007/0033520 A1 | 2/2007 | Kimzey et al. |
| 2007/0053513 A1 | 3/2007 | Hoffberg |
| 2007/0100519 A1 | 5/2007 | Engel |
| 2007/0150368 A1 | 6/2007 | Arora et al. |
| 2007/0209011 A1 | 9/2007 | Padmanabhuni et al. |
| 2007/0226540 A1 | 9/2007 | Konieczny |
| 2007/0250229 A1 | 10/2007 | Wu |
| 2007/0250327 A1 | 10/2007 | Hedy |
| 2007/0250840 A1 | 10/2007 | Coker et al. |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2007/0294192 A1 | 12/2007 | Tellefsen |
| 2007/0299940 A1 | 12/2007 | Gbadegesin et al. |
| 2008/0010561 A1 | 1/2008 | Bay et al. |
| 2008/0015921 A1 | 1/2008 | Libman |
| 2008/0015929 A1 | 1/2008 | Koeppel et al. |
| 2008/0027827 A1 | 1/2008 | Eglen et al. |
| 2008/0119983 A1 | 5/2008 | Inbarajan et al. |
| 2008/0172632 A1 | 7/2008 | Stambaugh |
| 2008/0189143 A1 | 8/2008 | Wurster |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2008/0255925 A1 | 10/2008 | Vailaya et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0089134 A1 | 4/2009 | Uyeki |
| 2009/0106036 A1 | 4/2009 | Tamura et al. |
| 2009/0112687 A1 | 4/2009 | Blair et al. |
| 2009/0138329 A1 | 5/2009 | Wanker |
| 2009/0182232 A1 | 7/2009 | Zhang et al. |
| 2009/0187513 A1 | 7/2009 | Noy et al. |
| 2009/0187939 A1 | 7/2009 | Lajoie |
| 2009/0198507 A1 | 8/2009 | Rhodus |
| 2009/0204454 A1 | 8/2009 | Lagudi |
| 2009/0204655 A1 | 8/2009 | Wendelberger |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0011415 A1 | 1/2010 | Cortes et al. |
| 2010/0023393 A1 | 1/2010 | Costy et al. |
| 2010/0070343 A1 | 3/2010 | Taira et al. |
| 2010/0082778 A1 | 4/2010 | Muilenburg et al. |
| 2010/0082780 A1 | 4/2010 | Muilenburg et al. |
| 2010/0088158 A1 | 4/2010 | Pollack |
| 2010/0100259 A1 | 4/2010 | Geiter |
| 2010/0100506 A1 | 4/2010 | Marot |
| 2010/0131363 A1 | 5/2010 | Sievert et al. |
| 2010/0235219 A1 | 9/2010 | Merrick et al. |
| 2010/0235231 A1 | 9/2010 | Jewer |
| 2010/0293030 A1 | 11/2010 | Wu |
| 2010/0312608 A1 | 12/2010 | Shan et al. |
| 2010/0318408 A1 | 12/2010 | Sankaran et al. |
| 2010/0324777 A1 | 12/2010 | Tominaga et al. |
| 2011/0010432 A1 | 1/2011 | Uyeki |
| 2011/0015989 A1 | 1/2011 | Tidwell et al. |
| 2011/0022525 A1 | 1/2011 | Swinson et al. |
| 2011/0082804 A1 | 4/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0196762 A1 | 8/2011 | Dupont |
| 2011/0224864 A1 | 9/2011 | Gellatly et al. |
| 2011/0231055 A1 | 9/2011 | Knight et al. |
| 2011/0288937 A1 | 11/2011 | Manoogian, III |
| 2011/0307296 A1 | 12/2011 | Hall et al. |
| 2011/0307411 A1 | 12/2011 | Bolivar et al. |
| 2012/0066010 A1 | 3/2012 | Williams et al. |
| 2012/0089474 A1 | 4/2012 | Xiao et al. |
| 2012/0095804 A1 | 4/2012 | Calabrese et al. |
| 2012/0116868 A1 | 5/2012 | Chin et al. |
| 2012/0158211 A1 | 6/2012 | Chen et al. |
| 2012/0209714 A1 | 8/2012 | Douglas et al. |
| 2012/0221125 A1 | 8/2012 | Bell |
| 2012/0265648 A1 | 10/2012 | Jerome et al. |
| 2012/0268294 A1 | 10/2012 | Michaelis et al. |
| 2012/0278886 A1 | 11/2012 | Luna |
| 2012/0284113 A1 | 11/2012 | Pollak |
| 2012/0316981 A1 | 12/2012 | Hoover et al. |
| 2013/0046432 A1 | 2/2013 | Edwards et al. |
| 2013/0080196 A1 | 3/2013 | Schroeder et al. |
| 2013/0080305 A1 | 3/2013 | Virag et al. |
| 2013/0151334 A1 | 6/2013 | Berkhin et al. |
| 2013/0151468 A1 | 6/2013 | Wu et al. |
| 2013/0191445 A1 | 7/2013 | Gayman et al. |
| 2013/0204484 A1 | 8/2013 | Ricci |
| 2013/0226699 A1 | 8/2013 | Long |
| 2013/0317864 A1 | 11/2013 | Tofte et al. |

(56) References Cited

U.S. PATENT DOCUMENTS

| | | |
|---|---|---|
| 2013/0325541 A1 | 12/2013 | Capriotti et al. |
| 2013/0332023 A1 | 12/2013 | Bertosa et al. |
| 2014/0012659 A1 | 1/2014 | Yan |
| 2014/0026037 A1 | 1/2014 | Garb et al. |
| 2014/0052327 A1 | 2/2014 | Hosein et al. |
| 2014/0081675 A1 | 3/2014 | Ives et al. |
| 2014/0088866 A1 | 3/2014 | Knapp et al. |
| 2014/0094992 A1 | 4/2014 | Lambert et al. |
| 2014/0122178 A1 | 5/2014 | Knight |
| 2014/0136278 A1 | 5/2014 | Carvalho |
| 2014/0229207 A1 | 8/2014 | Swamy et al. |
| 2014/0229391 A1 | 8/2014 | East et al. |
| 2014/0244110 A1 | 8/2014 | Tharaldson et al. |
| 2014/0277906 A1 | 9/2014 | Lowrey et al. |
| 2014/0278805 A1 | 9/2014 | Thompson |
| 2014/0316825 A1 | 10/2014 | Van Dijk et al. |
| 2014/0324275 A1 | 10/2014 | Stanek et al. |
| 2014/0324536 A1 | 10/2014 | Cotton |
| 2014/0331301 A1 | 11/2014 | Subramani et al. |
| 2014/0337163 A1 | 11/2014 | Whisnant |
| 2014/0337825 A1 | 11/2014 | Challa et al. |
| 2014/0379530 A1 | 12/2014 | Kim et al. |
| 2014/0379817 A1 | 12/2014 | Logue et al. |
| 2015/0032546 A1 | 1/2015 | Calman et al. |
| 2015/0057875 A1 | 2/2015 | McGinnis et al. |
| 2015/0058151 A1 | 2/2015 | Sims et al. |
| 2015/0066781 A1 | 3/2015 | Johnson et al. |
| 2015/0066933 A1 | 3/2015 | Kolodziej et al. |
| 2015/0100199 A1 | 4/2015 | Kurnik et al. |
| 2015/0142256 A1 | 5/2015 | Jones |
| 2015/0142535 A1 | 5/2015 | Payne et al. |
| 2015/0207701 A1 | 7/2015 | Faaborg et al. |
| 2015/0227894 A1 | 8/2015 | Mapes, Jr. et al. |
| 2015/0242819 A1 | 8/2015 | Moses et al. |
| 2015/0248761 A1 | 9/2015 | Dong et al. |
| 2015/0254591 A1 | 9/2015 | Raskind |
| 2015/0268059 A1 | 9/2015 | Borghesani et al. |
| 2015/0268975 A1 | 9/2015 | Du et al. |
| 2015/0278886 A1 | 10/2015 | Fusz |
| 2015/0286475 A1 | 10/2015 | Vangelov et al. |
| 2015/0286979 A1 | 10/2015 | Ming et al. |
| 2015/0290795 A1 | 10/2015 | Oleynik |
| 2015/0334165 A1 | 11/2015 | Arling et al. |
| 2016/0004516 A1 | 1/2016 | Ivanov et al. |
| 2016/0059412 A1 | 3/2016 | Oleynik |
| 2016/0071054 A1 | 3/2016 | Kakarala et al. |
| 2016/0092944 A1 | 3/2016 | Taylor et al. |
| 2016/0132935 A1 | 5/2016 | Shen et al. |
| 2016/0140609 A1 | 5/2016 | Demir |
| 2016/0140620 A1 | 5/2016 | Pinkowish et al. |
| 2016/0140622 A1 | 5/2016 | Wang et al. |
| 2016/0148439 A1 | 5/2016 | Akselrod et al. |
| 2016/0162817 A1 | 6/2016 | Grimaldi et al. |
| 2016/0179968 A1 | 6/2016 | Ormseth et al. |
| 2016/0180358 A1 | 6/2016 | Battista |
| 2016/0180378 A1 | 6/2016 | Toshida et al. |
| 2016/0180418 A1 | 6/2016 | Jaeger |
| 2016/0267503 A1 | 9/2016 | Zakai-Or et al. |
| 2016/0275533 A1 | 9/2016 | Smith et al. |
| 2016/0277510 A1 | 9/2016 | Du et al. |
| 2016/0307174 A1 | 10/2016 | Marcelle et al. |
| 2016/0335727 A1 | 11/2016 | Jimenez |
| 2016/0337278 A1* | 11/2016 | Peruri ................... G06F 16/288 |
| 2016/0357599 A1 | 12/2016 | Glatfelter |
| 2016/0371641 A1 | 12/2016 | Wilson et al. |
| 2017/0034547 A1 | 2/2017 | Jain et al. |
| 2017/0039785 A1 | 2/2017 | Richter et al. |
| 2017/0053460 A1 | 2/2017 | Hauser et al. |
| 2017/0060929 A1 | 3/2017 | Chesla et al. |
| 2017/0064038 A1 | 3/2017 | Chen |
| 2017/0093700 A1* | 3/2017 | Gilley .................... H04L 69/08 |
| 2017/0124525 A1 | 5/2017 | Johnson et al. |
| 2017/0126848 A1* | 5/2017 | George ................... H04L 69/18 |
| 2017/0206465 A1 | 7/2017 | Jin et al. |
| 2017/0262894 A1 | 9/2017 | Kirti et al. |
| 2017/0293894 A1 | 10/2017 | Taliwal et al. |
| 2017/0308844 A1 | 10/2017 | Kelley |
| 2017/0308864 A1 | 10/2017 | Kelley |
| 2017/0308865 A1 | 10/2017 | Kelley |
| 2017/0316459 A1 | 11/2017 | Strauss et al. |
| 2017/0337573 A1 | 11/2017 | Toprak |
| 2017/0352054 A1 | 12/2017 | Ma et al. |
| 2017/0359216 A1 | 12/2017 | Naiden et al. |
| 2017/0364733 A1 | 12/2017 | Estrada et al. |
| 2018/0067932 A1 | 3/2018 | Paterson et al. |
| 2018/0074864 A1 | 3/2018 | Chen et al. |
| 2018/0095733 A1 | 4/2018 | Torman et al. |
| 2018/0173806 A1 | 6/2018 | Forstmann et al. |
| 2018/0204281 A1 | 7/2018 | Painter et al. |
| 2018/0225710 A1 | 8/2018 | Kar et al. |
| 2018/0232749 A1 | 8/2018 | Moore, Jr. et al. |
| 2018/0285901 A1 | 10/2018 | Zackrone |
| 2018/0285925 A1 | 10/2018 | Zackrone |
| 2018/0300124 A1* | 10/2018 | Malladi ................. H04L 67/561 |
| 2019/0028360 A1* | 1/2019 | Douglas ................. H04L 41/22 |
| 2019/0073641 A1 | 3/2019 | Utke |
| 2019/0114330 A1 | 4/2019 | Xu et al. |
| 2019/0213426 A1 | 7/2019 | Chen et al. |
| 2019/0294878 A1 | 9/2019 | Endras et al. |
| 2019/0297162 A1 | 9/2019 | Amar et al. |
| 2019/0334884 A1 | 10/2019 | Ross et al. |
| 2020/0019388 A1 | 1/2020 | Jaeger et al. |
| 2020/0038363 A1 | 2/2020 | Kim |
| 2020/0050879 A1 | 2/2020 | Zaman et al. |
| 2020/0066067 A1 | 2/2020 | Herman et al. |
| 2020/0118365 A1 | 4/2020 | Wang et al. |
| 2020/0177476 A1 | 6/2020 | Agarwal et al. |
| 2020/0327371 A1* | 10/2020 | Sharma .................. H04L 67/34 |
| 2021/0072976 A1 | 3/2021 | Chintagunta et al. |
| 2021/0090694 A1* | 3/2021 | Colley ................... G16H 15/00 |
| 2021/0157562 A1 | 5/2021 | Sethi et al. |
| 2021/0184780 A1 | 6/2021 | Yang et al. |
| 2021/0224975 A1 | 7/2021 | Ranca et al. |
| 2021/0240657 A1 | 8/2021 | Kumar et al. |
| 2021/0256616 A1 | 8/2021 | Hayard et al. |
| 2021/0287106 A1 | 9/2021 | Jerram |
| 2021/0303644 A1* | 9/2021 | Shear ...................... G06F 16/93 |
| 2021/0350334 A1 | 11/2021 | Ave et al. |
| 2021/0359940 A1 | 11/2021 | Shen et al. |
| 2022/0020086 A1 | 1/2022 | Kuchenbecker et al. |
| 2022/0028928 A1 | 1/2022 | Seo et al. |
| 2022/0046105 A1 | 2/2022 | Amar et al. |
| 2022/0172723 A1 | 6/2022 | Tendolkar et al. |
| 2022/0191663 A1 | 6/2022 | Karpoor et al. |
| 2022/0208319 A1 | 6/2022 | Ansari et al. |
| 2022/0237084 A1 | 7/2022 | Bhagi et al. |
| 2022/0237171 A1 | 7/2022 | Bailey et al. |
| 2022/0293107 A1* | 9/2022 | Leaman ................. G10L 15/26 |
| 2022/0300735 A1 | 9/2022 | Kelly et al. |
| 2023/0214892 A1 | 7/2023 | Christian et al. |

OTHER PUBLICATIONS

Chadwick, D.W., "Understanding X.500—The Directory", Available at <http://sec.cs.kent.ac.uk/x500book/>. Entire work cited., 1996.

Chatterjee, Pallab, et al., "On-board diagnostics not just for racing anymore", EDN.com, May 6, 2013, 7 pages.

Chen, Deren, "Business to Business Standard and Supply Chain System Framework in Virtual Enterprises", Computer Supported Cooperative Work in Design, The Sixth International Conference on 2001, pp. 472-476.

Clemens Grelck, "A Multithread Compiler Backend for High-Level Array Programming", 2003.

CNY Business Journal, "Frank La Voila named Southern Tier Small-Business Person of 1999", Jun. 11, 1999, 2 pages.

Croswell, Wayne, "Service Shop Optimiztion", Modern Tire Retailer, May 21, 2013, 7 pages.

Davis, Peter T., et al., "Sams Teach Yourself Microsoft Windows NT Server 4 in 21 Days", Sams@ Publishing, ISBN: 0-672-31555-6, 1999, printed Dec. 21, 2008, 15 pages.

(56) References Cited

OTHER PUBLICATIONS

Derfler, Frank J., et al., "How Networks Work: Millennium Edition", Que, A Division of Macmillan Computer Publishing, ISBN: 0-7897-2445-6, 2000, 9 pages.

Drawbaugh, Ben, "Automatic Link Review: an expensive way to learn better driving habits", Endgadget.com, Nov. 26, 2013, 14 pages.

Emmanuel, Daniel, "Basics to Creating an Appointment System for Automotive Service Customers", Automotiveservicemanagement.com, 2006, 9 pages.

Hogue, et al., "Thresher: Automating the Unwrapping of Semantic Content from the World Wide Web", ACM, 2005, pp. 86-95.

Housel, Barron C., et al., "WebExpress: A client/intercept based system for optimizing Web browsing in a wireless environment", Google, 1998, pp. 419-431.

Hu, Bo, "A Platform based Distributed Service Framework for Large-scale Cloud Ecosystem Development", IEEE Computer Society, 2015, 8 pages.

Interconnection, In Roget's Il The New Thesaurus. Boston, MA: Houghton Mifflin http://www.credoreference.com/entry/hmrogets/interconnection, 2003, Retrieved Jul. 16, 2009, 1 page.

Jenkins, Will, "Real-time vehicle performance monitoring with data intergrity", A Thesis Submitted to the Faculty of Mississippi State University, Oct. 2006, 57 pages.

Johns, Pamela, et al., "Competitive intelligence in service marketing", Marketing Intelligence & Planning, vol. 28, No. 5, 2010, pp. 551-570.

Lavrinc, Damon, "First Android-powered infotainment system coming to 2012 Saab 9-3", Autoblog.com, Mar. 2, 2011, 8 pages.

Lee, Adam J., et al., "Searching for Open Windows and Unlocked Doors: Port Scanning in Large-Scale Commodity Clusters", Cluster Computing and the Grid, 2005. IEEE International Symposium on vol. 1, 2005, pp. 146-151.

Michener, J.R., et al., "Managing System and Active-Content Integrity", Computer; vol. 33, Issue: 7, 2000, pp. 108-110.

Milic-Frayling, Natasa, et al., "SmartView: Enhanced Document Viewer for Mobile Devices", Google, Nov. 15, 2002, 11 pages.

Needham, Charlie, "Google Now Taking Appointments for Auto Repair Shops", Autoshopsolutions.com, Aug. 25, 2015, 6 pages.

Open Bank Project, https://www.openbankproject.com/, retrieved Nov. 23, 2020, 10 pages.

openbay.com Web Pages, Openbay.com, retrieved from archive.org May 14, 2019, Apr. 2015, 6 pages.

openbay.com Web Pages, Openbay.com, retrieved from archive.org on May 14, 2019, Feb. 2014, 2 pages.

openbay.com Web Pages, Openbay.com, retrieved from archive.org, May 14, 2019, Mar. 2015, 11 pages.

Phelan, Mark, "Smart phone app aims to automate car repairs", Detroit Free Press Auto Critic, Mar. 31, 2015, 2 pages.

Pubnub Staff, "Streaming Vehicle Data in Realtime with Automatic (Pt 1)", Pubnub.com, Aug. 17, 2015, 13 pages.

Standards for Technology in Auto, https://www.starstandard.org/, retrieved Nov. 23, 2020, 4 pages.

Strebe, Matthew, et al., MCSE: NT Server 4 Study Guide, Third Edition. SYBEX Inc. Front matter, 2000, pp. 284-293, and 308-347.

Warren, Tamara, "This Device Determines What Ails Your Car and Finds a Repair Shop—Automatically", CarAndDriver.com, Apr. 8, 2015, 7 pages.

You, Song, et al., "Overview of Remote Diagnosis and Maintenance for Automotive Systems", 2005 SAE World Congress, Apr. 11-14, 2015, 10 pages.

http:/web.archive.org/web/20010718130244/http://chromedata.com/maing2/about/index.asp, 1 pg.

http://web.archive.org/web/20050305055408/http://www.dealerclick.com/, 1 pg.

http://web.archive.org/web/20050528073821/http://www.kbb.com/, 1 pg.

http://web.archive.org/web/20050531000823/http://www.carfax.com/, 1 pg.

Internet Archive Wayback Machine, archive of LDAP Browser.com—FAQ. Archived Dec. 11, 2000. Available at <http://web.archive.org/web/200012110152/http://www.ldapbrowser.com/faq/faq.php3?sID=fe4ae66f023d86909f35e974f3a1ce>.

Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.

Internet Archive: Audio Archive, http://www.archive.org/audio/audio-searchresults.php?search=@start=0&limit=100&sort=ad, printed May 12, 2004, 12 pgs.

Internet Archive: Democracy Now, http://www.archive.org/audio/collection.php?collection=democracy_now, printed May 12, 2004, 2 pgs.

Java 2 Platform, Enterprise Edition (J2EE) Overview, printed Mar. 6, 2010, 3 pgs.

Java version history—Wikipedia, the free encyclopedia, printed Mar. 6, 2010, 9 pgs.

Permissions in the Java™ 2 SDK, printed Mar. 6, 2010, 45 pgs.

Trademark Application, Serial No. 76375405. 13 pages of advertising material and other application papers enclosed. Available from Trademark Document Retrieval system at.

Trademark Electronic Search System record for Serial No. 76375405, Word Mark "NITRA".

"An Appointment with Destiny—The Time for Web-Enabled Scheduling has Arrived", Link Fall, 2007, 2 pages.

"How a Solution found a Problem of Scheduling Service Appointments", Automotive News, 2016, 4 pages.

"IBM Tivoli Access Manager Base Administration Guide", Version 5.1. International Business Machines Corporation. Entire book enclosed and cited., 2003, 402 pgs.

"NetFormx Offers Advanced Network Discovery Software", PR Newswire. Retrieved from http://www.highbeam.com/doc/1G1-54102907.html>., Mar. 15, 1999.

"Openbay Announces First-of-its-Kind Connected Car Repair Service", openbay.com, Mar. 31, 2015, 14 pages.

"Service Advisor", Automotive Dealership Institute, 2007, 26 pages.

"xTime.com Web Pages", Jan. 8, 2015, 1 page.

"xTimes Newsletter", vol. 7, 2013, 4 pages.

U.S. Appl. No. 10/350,795, Non-Final Office Action, Dec. 26, 2008, 13 pages.

U.S. Appl. No. 10/350,795, Non-Final Office Action, Feb. 6, 2006, 11 pages.

U.S. Appl. No. 10/350,795, Non-Final Office Action, Jul. 22, 2009, 22 pages.

U.S. Appl. No. 10/350,795, Final Office Action, Jul. 6, 2012, 26 pages.

U.S. Appl. No. 10/350,795, Non-Final Office Action, Jun. 29, 2006, 11 pages.

U.S. Appl. No. 10/350,795, Non-Final Office Action, Mar. 12, 2007, 10 pages.

U.S. Appl. No. 10/350,795, Final Office Action, Mar. 3, 2010, 24 pages.

U.S. Appl. No. 10/350,795, Non-Final Office Action, May 29, 2008, 10 pages.

U.S. Appl. No. 10/350,795, Notice of Allowance, May 7, 2012, 15 pages.

U.S. Appl. No. 10/350,795, Non-Final Office Action, Nov. 1, 2010, 19 pages.

U.S. Appl. No. 10/350,796, Notice of Allowance, Feb. 1, 2006, 5 pages.

U.S. Appl. No. 10/350,796, Non-Final Office Action, May 19, 2005, 7 pages.

U.S. Appl. No. 10/350,810, Notice of Allowance, Apr. 14, 2008, 6 pages.

U.S. Appl. No. 10/350,810, Non-Final Office Action, Apr. 17, 2007, 12 pages.

U.S. Appl. No. 10/350,810, Final Office Action, Apr. 5, 2005, 12 pages.

U.S. Appl. No. 10/350,810, Notice of Non-compliant Amendment, Dec. 12, 2006.

(56) References Cited

OTHER PUBLICATIONS

U.S. Appl. No. 10/350,810, Non-Final Office Action, Dec. 9, 2005, 14 pages.
U.S. Appl. No. 10/350,810, Final Office Action, May 18, 2006, 15 pages.
U.S. Appl. No. 10/350,810, Final Office Action, Nov. 14, 2007, 13 pages.
U.S. Appl. No. 10/350,810, Non-Final Office Action, Sep. 22, 2004, 10 pages.
U.S. Appl. No. 10/351,465, Non-Final Office Action, Jul. 27, 2004, 9 pages.
U.S. Appl. No. 10/351,465, Final Office Action, May 5, 2005, 8 pages.
U.S. Appl. No. 10/351,465, Notice of Allowance, Sep. 21, 2005, 4 pages.
U.S. Appl. No. 10/351,606, Notice of Allowance, Apr. 4, 2006, 12 pages.
U.S. Appl. No. 10/665,899, Non-Final Office Action, Sep. 17, 2017, 11 pages.
U.S. Appl. No. 10/351,606, Non-final Office Action, Dec. 19, 2005, 7 pages.
U.S. Appl. No. 10/665,899, Final Office Action, Mar. 8, 2011, 21 pages.
U.S. Appl. No. 10/351,606, Non-final Office Action, May 17, 2004, 5 pages.
U.S. Appl. No. 10/665,899, Final Office Action, Jul. 7, 2008, 11 pages.
U.S. Appl. No. 10/665,899, Non-Final Office Action, Aug. 30, 2010, 23 pages.
U.S. Appl. No. 10/665,899, Final Office Action, Feb. 24, 2010, 22 pages.
U.S. Appl. No. 10/665,899, Final Office Action, May 11, 2009, 14 pages.
U.S. Appl. No. 10/665,899, Non-Final Office Action, Nov. 13, 2008, 11 pages.
U.S. Appl. No. 10/665,899, Non-Final Office Action, Sep. 14, 2009, 14 pages.
U.S. Appl. No. 11/149,909, Final Office Action, Feb. 4, 2009, 14 pages.
U.S. Appl. No. 11/149,909, Non-Final Office Action, May 13, 2008, 14 pages.
U.S. Appl. No. 11/149,909, Non-Final Office Action, May 6, 2009, 6 pages.
U.S. Appl. No. 11/149,909, Notice of Allowance, Sep. 16, 2009, 7 pages.
U.S. Appl. No. 11/414,939, Non-Final Office Action, Jul. 19, 2010, 7 pages.
U.S. Appl. No. 11/414,939, Notice of Allowance, Nov. 2, 2010.
U.S. Appl. No. 11/442,821, Final Office Action, Apr. 7, 2009, 19 pages.
U.S. Appl. No. 11/442,821, Notice of Allowance, Jul. 30, 2012, 6 pages.
U.S. Appl. No. 11/442,821, Non-Final Office Action, Jun. 1, 2011, 23 pages.
U.S. Appl. No. 11/442,821, Final Office Action, May 21, 2010, 28 pages.
U.S. Appl. No. 11/442,821, Non-Final Office Action, Nov. 12, 2009, 19 pages.
U.S. Appl. No. 11/442,821, Final Office Action, Nov. 29, 2011, 26 pages.
U.S. Appl. No. 11/442,821, Non-Final Office Action, Sep. 3, 2008, 14 pages.
U.S. Appl. No. 11/446,011, Notice of Allowance, Aug. 9, 2011, 10 pages.
U.S. Appl. No. 11/446,011, Final Office Action, Jun. 8, 2010, 12 pages.
U.S. Appl. No. 11/446,011, Non-Final Office Action, Mar. 1, 2011, 15 pages.
U.S. Appl. No. 11/446,011, Non-Final Office Action, Nov. 27, 2009, 14 pages.
U.S. Appl. No. 11/524,602, Notice of Allowance, Aug. 6, 2013, 22 pages.
U.S. Appl. No. 11/524,602, Non-Final Office Action, Dec. 11, 2009, 20 pages.
U.S. Appl. No. 11/524,602, Final Office Action, Jul. 27, 2010, 13 pages.
U.S. Appl. No. 11/524,602, Final Office Action, Jun. 26, 2012, 11 pages.
U.S. Appl. No. 11/524,602, Non-Final Office Action, Nov. 14, 2011, 19 pages.
U.S. Appl. No. 11/525,009, Non-Final Office Action, Aug. 10, 2011, 18 pages.
U.S. Appl. No. 11/525,009, Final Office Action, Aug. 3, 2010, 16 pages.
U.S. Appl. No. 11/525,009, Non-Final Office Action, Dec. 16, 2009, 20 pages.
U.S. Appl. No. 11/525,009, Notice of Allowance, Jul. 23, 2012, 19 pages.
U.S. Appl. No. 12/243,852, Restriction Requirement, Dec. 7, 2010.
U.S. Appl. No. 12/243,852, Notice of Allowance, Feb. 27, 2013, 6 pages.
U.S. Appl. No. 12/243,852, Non-Final Office Action, Jan. 16, 2013, 5 pages.
U.S. Appl. No. 12/243,852, Non-Final Office Action, Mar. 17, 2011, 8 pages.
U.S. Appl. No. 12/243,852, Supplemental Notice of Allowability, Mar. 19, 2013, 3 pages.
U.S. Appl. No. 12/243,852, Final Office Action, Oct. 24, 2011, 13 pages.
U.S. Appl. No. 12/243,855, Notice of Allowance, Nov. 22, 2010, 10 pages.
U.S. Appl. No. 12/243,855, Non-Final Office Action, Oct. 14, 2010, 6 pages.
U.S. Appl. No. 12/243,855, Notice of Allowance, Oct. 28, 2010, 5 pages.
U.S. Appl. No. 12/243,861, Final Office Action, Jun. 22, 2011, 5 pages.
U.S. Appl. No. 12/243,861, Non-Final Office Action, Nov. 8, 2010, 8 pgs.
U.S. Appl. No. 12/243,861, Notice of Allowance, Sep. 6, 2011, 10 pgs.
U.S. Appl. No. 13/025,019, Non-Final Office Action, Apr. 22, 2016, 16 pages.
U.S. Appl. No. 13/025,019, Non-Final Office Action, Apr. 5, 2013, 15 pages.
U.S. Appl. No. 13/025,019, Final Office Action, Aug. 28, 2015, 25 pages.
U.S. Appl. No. 13/025,019, Final Office Action, Dec. 20, 2016, 16 pages.
U.S. Appl. No. 13/025,019, Non-Final Office Action, Sep. 18, 2014, 15 pages.
U.S. Appl. No. 13/025,019, Final Office Action, Jul. 13, 2018, 11 pages.
U.S. Appl. No. 13/025,019, Non-Final Office Action, Oct. 6, 2017, 17 pages.
U.S. Appl. No. 13/025,019, Final Office Action, Sep. 12, 2013, 13 pages.
U.S. Appl. No. 13/025,019, Notice of Allowance, Sep. 26, 2019, 9 pages.
U.S. Appl. No. 14/208,042, Final Office Action, Apr. 16, 2018.
U.S. Appl. No. 14/208,042, Non-Final Office Action, Aug. 21, 2020, 13 pages.
U.S. Appl. No. 14/208,042, Final Office Action, Dec. 6, 2016, 26 pages.
U.S. Appl. No. 14/208,042, Final Office Action, Jan. 11, 2019, 16 pages.
U.S. Appl. No. 14/208,042, Advisory Action, Jul. 12, 2018.
U.S. Appl. No. 14/208,042, Non-Final Office Action, Jun. 30, 2016, 23 pages.
U.S. Appl. No. 14/208,042, Notice of Allowance, May 6, 2021, 13 pages.
U.S. Appl. No. 14/208,042, Non-Final Office Action, Sep. 20, 2017.
U.S. Appl. No. 14/208,042, Non-Final Office Action, Sep. 21, 2018.

(56) References Cited

OTHER PUBLICATIONS

U.S. Appl. No. 15/134,779, Final Office Action, Feb. 27, 2020, 18 pages.
U.S. Appl. No. 15/134,779, Non-Final Office Action, Jan. 30, 2019, 26 pages.
U.S. Appl. No. 15/134,779, Advisory Action, Jul. 29, 2019, 6 pages.
U.S. Appl. No. 15/134,779, Final Office Action, May 17, 2019, 25 pages.
U.S. Appl. No. 15/134,779, Non-Final Office Action, Nov. 19, 2019, 27 pages.
U.S. Appl. No. 15/134,779, Notice of Allowance, Sep. 9, 2020, 12 pages.
U.S. Appl. No. 15/134,793, Non-Final Office Action, Jan. 30, 2019, 26 pages.
U.S. Appl. No. 15/134,793, Advisory Action, Jul. 29, 2019, 6 pages.
U.S. Appl. No. 15/134,793, Final Office Action, Mar. 27, 2020, 22 pages.
U.S. Appl. No. 15/134,793, Final Office Action, May 13, 2019, 26 pages.
U.S. Appl. No. 15/134,793, Non-Final Office Action, Nov. 19, 2019, 31 pages.
U.S. Appl. No. 15/134,793, Notice of Allowance, Nov. 2, 2020, 13 pages.
U.S. Appl. No. 15/134,820, Non-Final Office Action, Feb. 23, 2018.
U.S. Appl. No. 15/134,820, Notice of Allowance, Jan. 28, 2019, 7 pages.
U.S. Appl. No. 15/134,820, Final Office Action, Sep. 21, 2018.
U.S. Appl. No. 15/478,042, Non-Final Office Action, Aug. 4, 2020, 42 pages.
U.S. Appl. No. 15/478,042, Final Office Action, Mar. 19, 2020, 35 pages.
U.S. Appl. No. 15/478,042, Final Office Action, May 5, 2021, 38 pages.
U.S. Appl. No. 15/478,042, Non-Final Office Action, Oct. 10, 2019, 26 pages.
U.S. Appl. No. 15/478,048, Final Office Action, Apr. 9, 2020, 42 pages.
U.S. Appl. No. 15/478,048, Non-Final Office Action, Mar. 8, 2021, 69 pages.
U.S. Appl. No. 15/478,048, Final Office Action, Sep. 17, 2021, 32 pages.
U.S. Appl. No. 15/478,048, Non-Final Office Action, Sep. 30, 2019, 30 pages.
U.S. Appl. No. 15/602,999, Notice of Allowance, Apr. 18, 2019, 6 pages.
U.S. Appl. No. 15/602,999, Advisory Action, Jan. 31, 2019, 3 pages.
U.S. Appl. No. 15/602,999, Non-Final Office Action, May 3, 2018.
U.S. Appl. No. 15/602,999, Final Office Action, Nov. 21, 2018.
U.S. Appl. No. 16/041,552, Final Office Action, Apr. 27, 2021, 23 pages.
U.S. Appl. No. 16/041,552, Non-Final Office Action, Dec. 27, 2019, 13 pages.
U.S. Appl. No. 16/041,552, Final Office Action, May 29, 2020, 18 pages.
U.S. Appl. No. 16/041,552, Non-Final Office Action, Sep. 17, 2020, 16 pages.
U.S. Appl. No. 16/041,552, Notice of Allowance, Sep. 30, 2021, 17 pages.
U.S. Appl. No. 16/911,154, Non-Final Office Action, Sep. 16, 2021, 15 pages.
U.S. Appl. No. 16/951,833, Non-Final Office Action, Feb. 4, 2021, 10 pages.
U.S. Appl. No. 16/951,833, Notice of Allowance, Jun. 16, 2021, 14 pages.
Aloisio, Giovanni, et al., "Web-based access to the Grid using the Grid Resource Broker portal", Google, 2002, pp. 1145-1160.
Anonymous, "Software ready for prime time", Automotive News. Detroit, vol. 76, Issue 5996, Nov. 5, 2001, p. 28.
U.S. Appl. No. 16/911,154, Final Office Action, Mar. 28, 2022, 17 pages.
U.S. Appl. No. 15/478,042, Non-Final Office Action, Nov. 19, 2021, 45 pages.
U.S. Appl. No. 17/156,254, Non-Final Office Action, Feb. 25, 2022, 18 pages.

* cited by examiner

SYSTEMS, METHODS, AND APPARATUSES FOR VERIFYING ENTRIES IN DISPARATE DATABASES

TECHNICAL FIELD

The present disclosure relates generally to data validation when replacing a database. More specifically, the present disclosure relates to methods, systems and apparatuses for validating entries in a legacy database and a modern database.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
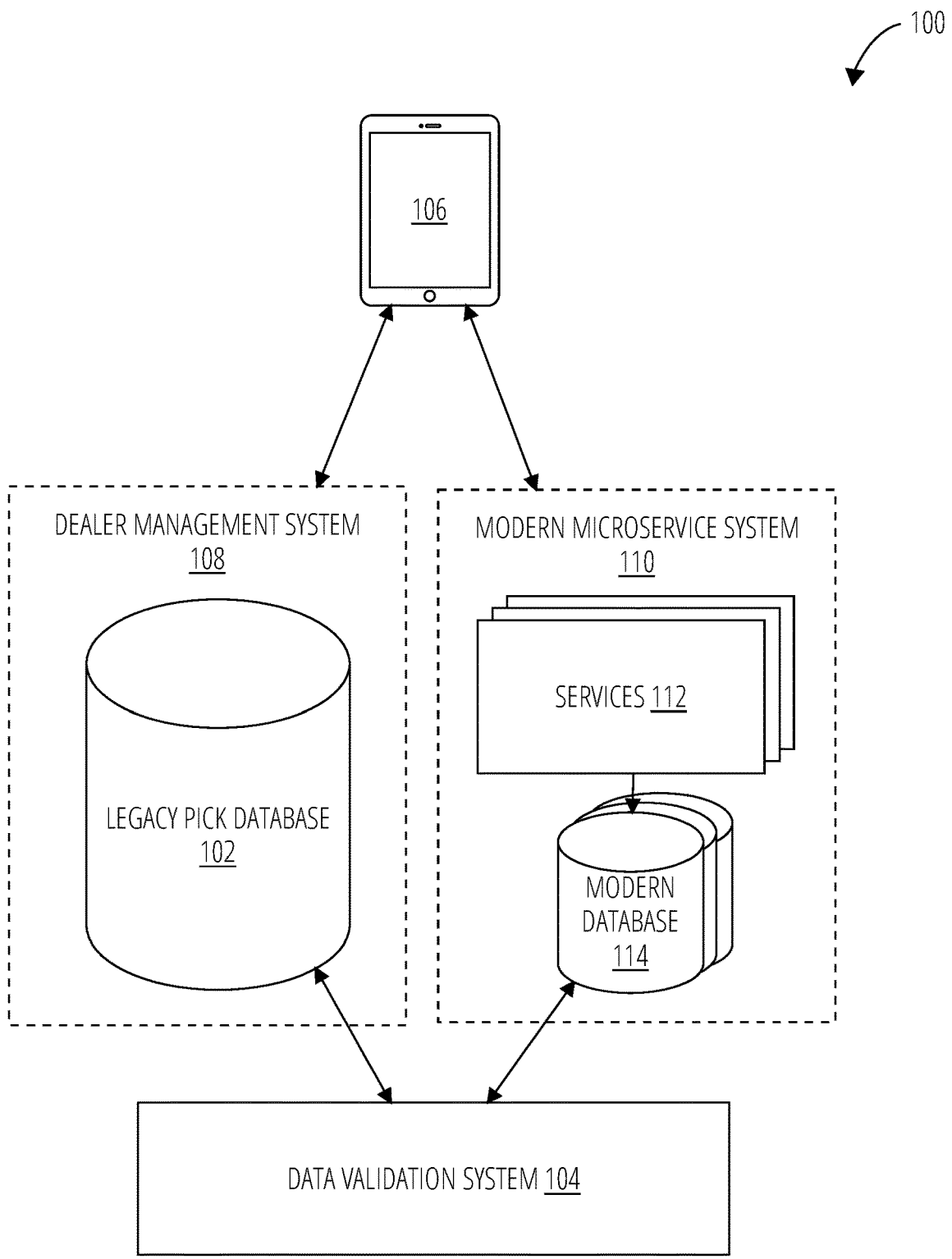
FIG. 1 illustrates an aspect of the subject matter in accordance with one embodiment.

Described herein are embodiments of systems, apparatuses, and methods for data validation so that entries in disparate databases (e.g., a legacy database and a modern database) that are operating simultaneously are synchronized.

Businesses occasionally replace and modernize their database environments. Often the move from a legacy database environment to a modern database environment involves moving between two different incompatible data architectures. Additionally, there is often a desire to gradually transition between the legacy database and the modern database to allow for data validation of the modern database while allowing applications to take advantage of the modern database. To provide data validation in some embodiments the two databases may be run in parallel and a validation system may compare updates to records in the legacy database against updates to the modern database. However, because the databases have different data architectures, comparing the updates may be inefficient.

One of the challenges of the transition between databases is handling the different architectures of the systems. To address this challenge, embodiments below include a comparison service that can compare two different databases structured in completely different ways.

Specific embodiments herein relate to replacing a legacy Pick environment with a modern microservice architecture. While movement between a Pick environment and a modern microservice architecture is discussed herein, embodiments herein may also be applied to transitioning between other database types.

The phrases "coupled to," "connected to," and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

It will be readily understood that the components of the embodiments as generally described below and illustrated in the Figures herein could be arranged and designed in a wide variety of different configurations. For instance, the steps of a method do not necessarily need to be executed in any specific order, or even sequentially, nor do the steps need to be executed only once. Thus, the following more detailed description of various embodiments, as described below and represented in the Figures, is not intended to limit the scope of the disclosure but is merely representative of various embodiments. While the various aspects of the embodiments are presented in the drawings, the drawings are not necessarily drawn to scale unless specifically indicated.

Embodiments and implementations of systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium having stored thereon instructions that may be used to program a computer system or other electronic device to perform the processes described herein. The computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or Internet Protocol (IP) networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using Transfer Control Protocol (TCP)/IP, SPX, IPX, and other protocols over twisted pair, coaxial, or optical fiber cables; telephone lines; radio waves; satellites; microwave relays; modulated AC power lines; physical media transfer;

and/or other data transmission "wires" known to those of skill in the art. The network may encompass smaller networks and/or be connectable to other networks through a gateway or similar mechanism.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools such as Modern Fortran, Java, Pascal, C++, C, PHP, .Net, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Aspects of certain embodiments may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

FIG. 1 illustrates a block diagram of a data system 100 transitioning from a dealer management system 108 to a modern microservice system 110. As shown, the data system 100 may operate two databases in parallel during a transition from a legacy database (e.g., dealer management system 108) to a modern database (e.g., modern microservice system 110).

Running the two databases in parallel may allow for a gradual roll out of the new architecture in a way that permits data validation and allows older applications to take advantage of the new environment. For example, an application running on a computing device 106 may have been developed for the legacy dealer management system 108. To upgrade to the modern microservice system 110, it may be desirous to have the application access both the modern microservice system 110 and the dealer management system 108 in parallel and track the changes in the dealer management system 108 in comparison to the modern microservice system 110 to validate that all of the changes to data in the dealer management system 108 are being captured by the modern microservice system 110.

For example, a business may desire to replace a legacy Pick environment (e.g., dealer management system 108) with a modern microservice architecture (e.g., modern microservice system 110). A Pick environment includes an operating system for databases that was developed decades ago. The Pick environment has an architecture with a centralized dealer management system 108 with applications and a legacy Pick database 102. A dealer management system 108 may refer to a stand-alone computer system that hosts the legacy data and code. Each client (i.e., a user of the data system 100) may have at least one dealer management system 108 to host the clients' applications and data. Occasionally a client may have more than one dealer management system 108.

The legacy software and database for the dealer management system 108 may have been developed over a long period of time. As a consequence, there may be a very large amount of messy code, messy database design, and a very large amount of complexity. For example, information corresponding to a specific object (e.g., customer, vendor, financial institution) controlled by the application of the computing device 106 may be spread over several data files. To further complicate matters, the data files may not be homogenous with respect to one object. For example, information corresponding to a customer may be in the same data file as information corresponding to a vendor. This unorganized and complicated set of data files may make it difficult to track changes to each object and make it difficult to compare changes made to the dealer management system 108 and the modern microservice system 110.

In contrast to the organization of the dealer management system 108, the new modern microservice system 110 may have a data architecture that structures an application as a collection of services 112 which stores information on a modern database 114. For example, the application controllable objects that are spread across multiple data files in the data system 100 may be ordered according to independent services 112. This change in data architecture from the dealer management system 108 to the modern microservice system 110 and the complexity of the dealer management system 108 makes data validation difficult and inefficient.

To reduce the complexity and improve efficiency of data validation, a data validation system 104 may track, filter, and compare updates to information corresponding to the objects as discussed in more detail below.

Figure 2:
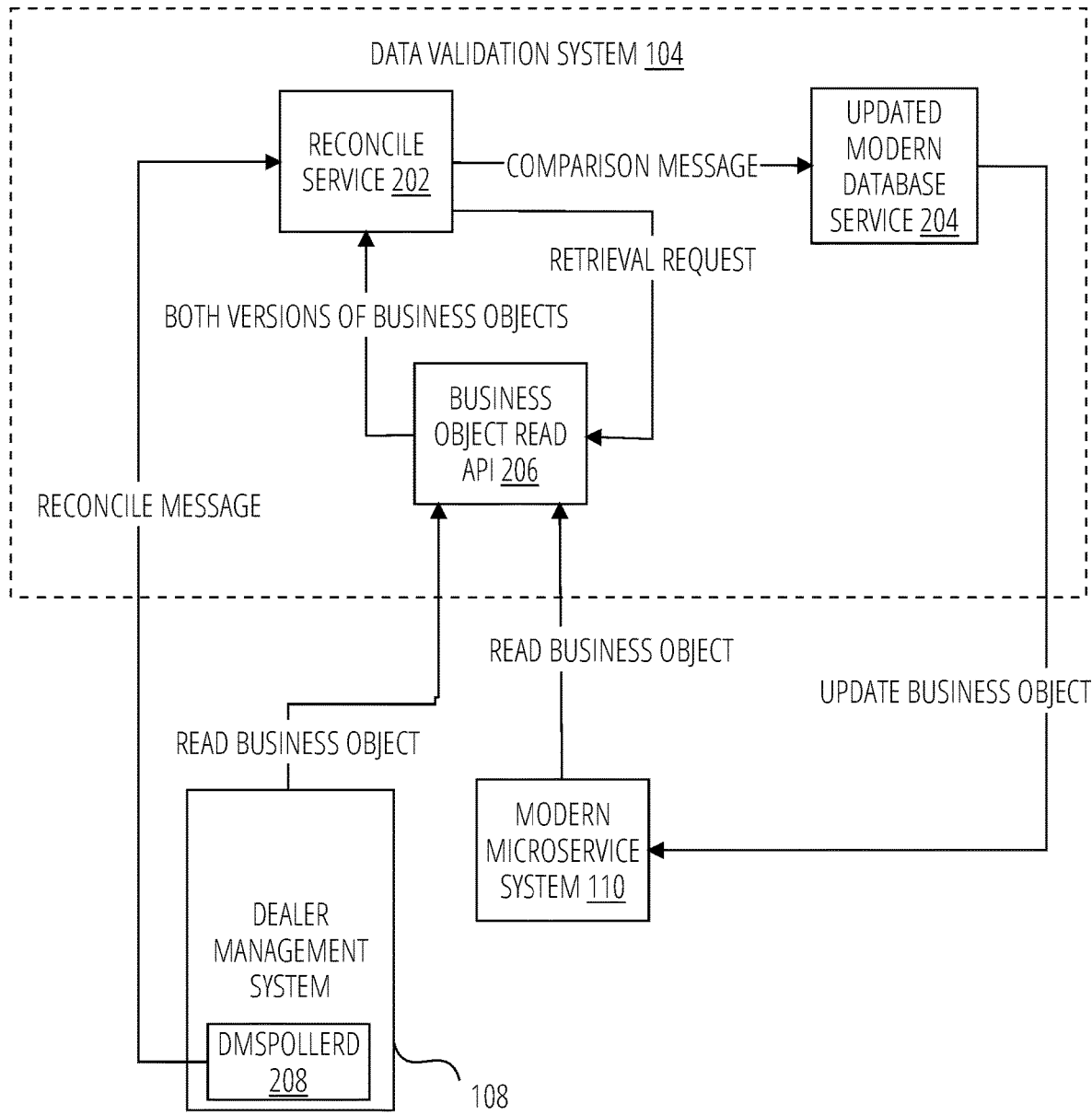
FIG. 2 illustrates an aspect of the subject matter in accordance with one embodiment.

FIG. 2 illustrates a simplified signal flow diagram for a data validation system 104. Replacing legacy code and an associated database (e.g., dealer management system 108) with a new, modern architecture database (e.g., modern microservice system 110) is a large and difficult process. Accordingly, it may be desirous to run the dealer management system 108 and the modern microservice system 110 simultaneously to allow older applications to take advantage of the new environment and ensure proper handling of data during the transition. However, running two databases simultaneously introduces a problem: ensuring that the two databases correctly handle data entries. The data validation system 104 may verify the data in the dealer management system 108 and the modern microservice system 110 even though they are different databases structured completely differently.

In the illustrated embodiment, the dealer management system 108 belongs to a car dealership. However, a similar system may be set up for other types of clients. The dealer management system 108 may comprise a plurality of data files (e.g., name-file, service-names, and customer comments). Each data file may comprise a series of items or records that make up data elements of the data file. As the dealer management system 108 may have been developed and updated for several decades, there may be a large amount of messy code, messy database design, and a very large amount of complexity that makes it difficult to completely replicate the functions of the Pick database on a new database system.

Accordingly, data validation may be desirous. Data validation may include determining that the updates occurring on the dealer management system 108 are also captured on the modern microservice system 110 that is running in parallel. Part of validating the data on the disparate systems involves comparing the data on each database to ensure that it is the same. However, the different data structures of the dealer management system 108 and the modern microservice system 110 may make it difficult to verify the data.

The new data structure may be developed around a plurality of objects. Objects, also referred to herein as business objects, may be a collection of closely related data elements, items, and/or records that represent information that a client business works with. For example, business objects may include customers, vehicles, and vehicle purchase contracts. In contrast, items related to one object may be incorporated into multiple data files on the dealer management system 108.

Additionally, each data file in the dealer management system 108 may include items related to multiple objects or items not related to an object. On the dealer management system 108, items are stored in the data files. A Pick item on the dealer management system 108 may correspond roughly to a record in a modern database. In other words, a Pick item may be described as a document, rather than a record. An example of a non-homogenous file may include a name-file. The name-file may contain most of the customer business object information. However, the name-file may also contain information about other business objects such as Employees, Vendors, Financial Institutions, and more. In some embodiments, a customer item in name-file may also even contain accounts receivable amounts and aging information.

The dealer management system 108 comprises a dmspollerd 208 which may be a daemon or service that runs on the dealer management system 108 and monitors for updates on data files and Pick items related to business objects. The dmspollerd 208 may periodically request the latest updates to Pick files and datafiles on the dealer management system 108. When dmspollerd 208 identifies a change to the dealer management system 108, the dmspollerd 208 may send a notice of the change. The notification may be a reconcile message sent to the reconcile service 202. In some embodiments, the reconcile message may be sent via Kafka.

The reconcile message may comprise the item keys and update time stamp. The item keys may provide an identification for the updated data. For example, the item key may be an identification for a business object associated with the updated data. In some embodiments, the message may look like the following example.

```
{
    "domain" : "Customer",
    "enterprise_id" : "E207187",
    "keys" : [
        {
            "depts" : [ "D100093794" ],
            "id" : "9014",
            "timestamp" : "1603193254.561832",
            "type" : "4"
        }
    ],
    "store_id" : "S100023739"
}
```

The reconcile service 202 may be listening for the reconcile message. Upon receiving a reconcile message, the reconcile service 202 may request a current version of the data indicated in the reconcile message from both the dealer management system 108 and the modern microservice system 110. For example, in some embodiments, the reconcile service 202 may send a retrieval request to the business object read API 206. The retrieval request may include the item key identifying the business object of interest.

The business object read API 206 may request and read the updated business object, as identified by the item key, from the dealer management system 108. The business object read API 206 may pull Pick data from the dealer management system 108. As the dealer management system 108 is a legacy system, the pulled data may be in a non-standard and unique format. For example, the dealer management system 108 may store data as strings. The business object read API 206 may convert the non-standard format into an external format. For example, the business object read API 206 may convert the data type from strings to an XML format and associate a tag with the data. For instance, the business object read API 206 may convert and label a date to a standard format and convert money to an expected type (e.g., an integer value). The label may provide context to the data. For example, when the information is translated, a tag may be added that identifies the date. For instance, a specific date may be tagged as a customer birthday. In some embodiments, the label and the data may be combined into a data table.

The business object read API 206 may assemble the data in the data table into business objects. In some embodiments, the business object read API 206 may filter entries in the data table to obtain a filtered data set based on the tags.

The filtered information may include data associated with tags that identify the information as corresponding with a business object. For example, the business objects may be customer business objects, employee business objects, vendor business objects, and financial institution business objects. If the tags relate to a business object, the business object read API 206 may include it in a filtered data set and exclude irrelevant data.

The data table may be in XML format. For a customer object, the data may include a variety of information about a customer including name, email, telephone number, address, other contact information, birthdate, credit score, customer identification, and driver license information. The XML data table may be a set of rows and columns containing the data. For example, each row of data may include a tag identifying the data followed by columns with the information related to that data. For example, one row may be tagged as email address, and the columns may include one or more email addresses associated with the customer.

The business object read API 206 may restructure the filtered XML data table into a common format. For example, the business object read API 206 may convert the data to a JSON format. Converting to JSON may allow for a more efficient comparison. For example, the conversion from the XML format to JSON may convert a relation like or single row of data to something that looks more like a document. The XML formatted file may have more columns then needed. For example, if there are some customers with five email addresses it will create empty cells for other customers without five email addresses. The JSON format may provide areas that can have as few or as many spaces as needed. Thus limiting the need for mostly empty columns that may be found in the XML formatted file.

The business object read API 206 may also retrieve corresponding data from the modern microservice system 110. That is, the business object read API 206 may request and read the business object from the modern microservice system 110 that corresponds with the business object read from the dealer management system 108. The business object read API 206 may also restructure the business object from the modern microservice system 110 to JSON. By converting objects from both data sources (e.g., dealer management system 108 and modern microservice system 110) to a common JSON format, it may allow a service that does not have knowledge of the type of business object to compare the objects.

The business object read API 206 may send both versions of the business object to the reconcile service 202. The reconcile service 202 compares the objects to determine that they match. For example, the reconcile service 202 may recursively compare the two different JSON-structured business objects to verify that they contain equivalent information. If a data mismatch is discovered, the reconcile service 202 may send a comparison message to the updated modern database service 204. The comparison message may contain a master copy of the business object. In some embodiments, the master copy is the copy obtained from the dealer management system 108. The updated modern database service 204 provides the modern microservice system 110 with an update to the business object if a discrepancy is found.

Figure 3:
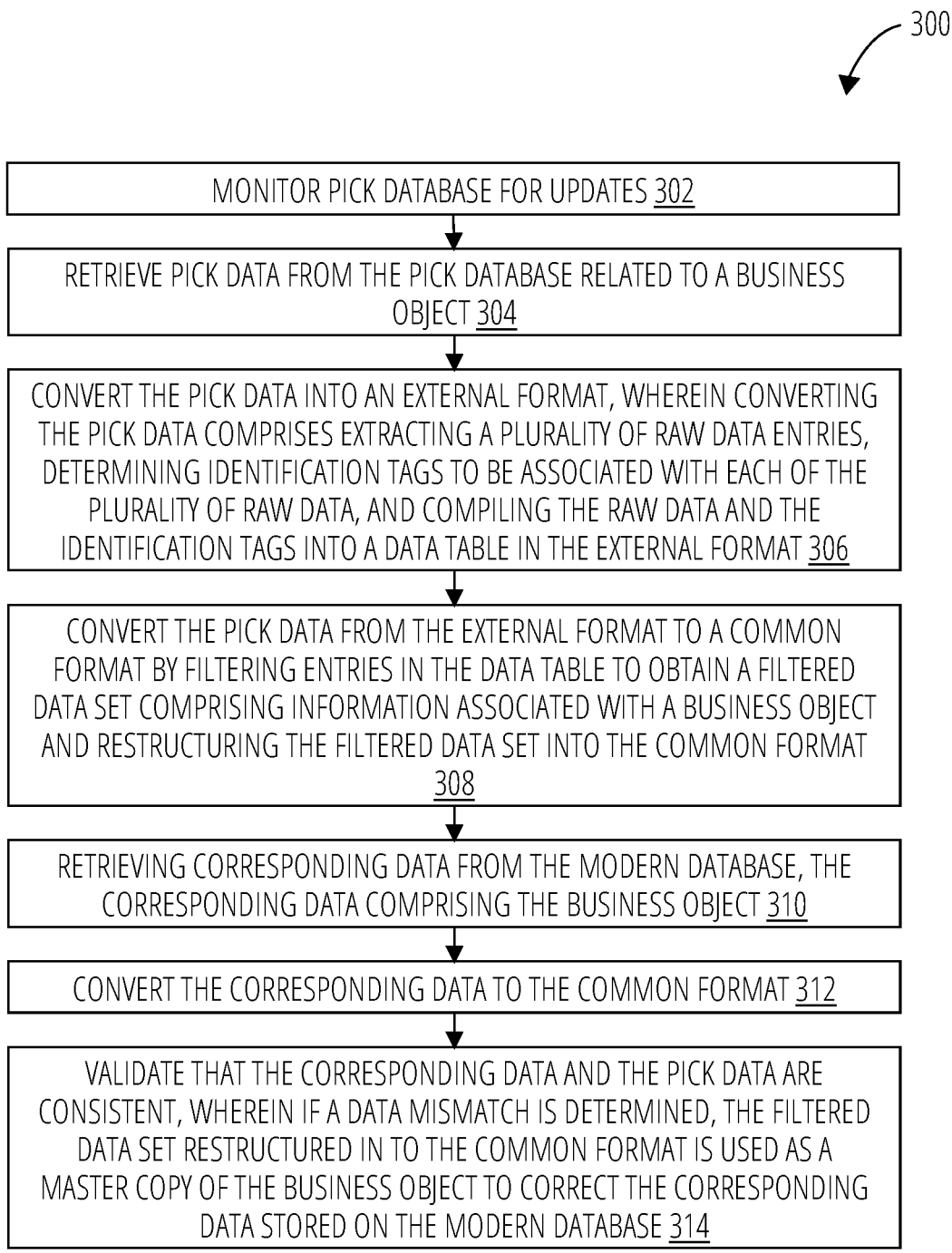
FIG. 3 illustrates a method 300 for validating data on disparate databases based on data stored on a Pick database in accordance with one embodiment.

FIG. 3 illustrates a method 300 for validating entries stored on multiple databases in accordance with one embodiment. The method 300 may be performed by a data validation system such as the data validation system 104 in FIG. 1. The multiple databases may include a Pick system and a modern microservice system.

As shown, the system using the method 300 may monitor 302 a Pick database for updates. When the system detects an update, it may retrieve 304 Pick data from the Pick database related to a business object. The system may convert 306 the Pick data into an external format. In some embodiments, converting the Pick data comprises extracting a plurality of raw data entries, determining identification tags to be associated with each of the plurality of raw data, and compiling the raw data and the identification tags into a data table in the external format. The external format may be XML. The system may also convert 308 the Pick data from the external format to a common format by filtering entries in the data table to obtain a filtered data set comprising information associated with a business object and restructuring the filtered data set into the common format. In some embodiments, the common format is JSON.

Similarly, the system may retrieve 310 corresponding data from the modern database. The corresponding data may include a copy of the business object retrieved from the Pick database as stored on the modern database. The system may convert 312 the corresponding data to the common format. The system may validate 314 that the corresponding data and the Pick data are consistent by comparing the entries converted to the common format. If a data mismatch is determined, the filtered data set from the Pick database that has been restructured into the common format may be used as a master copy of the business object to correct the corresponding data stored on the modern database. In some embodiments, the system may send a message identifying the correction to be made. In other embodiments, the system may format a business object according to the structure of the modern database and send the entire business object.

Figure 4:
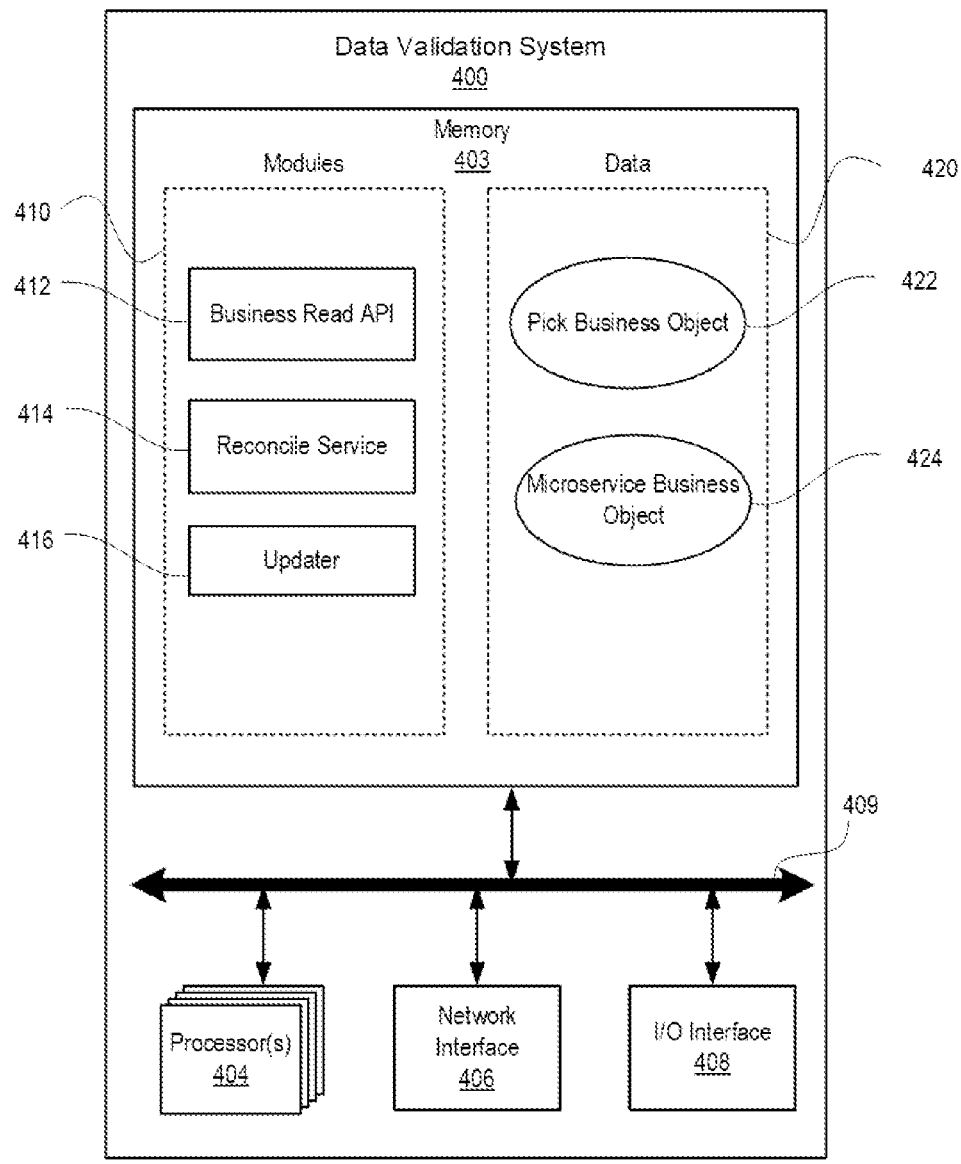
FIG. 4 illustrates an aspect of the subject matter in accordance with one embodiment.

FIG. 4 is a block diagram of a data validation system 400 according to one embodiment. The data validation system 400 may perform the methods and use the techniques described with reference to the other Figures in the specification. The data validation system 400 can include a memory 403, one or more processors 404, a network interface 406, an input/output interface 408, and a system bus 409.

The one or more processors 404 may include one or more general-purpose devices such as an Intel®, AMD®, or other standard microprocessor. The one or more processors 404 may include a special-purpose processing device such as ASIC, SoC, SiP, FPGA, PAL, PLA, FPLA, PLD, or other customized or programmable device. The one or more processors 404 can perform distributed (e.g., parallel) processing to execute or otherwise implement functionalities of the presently disclosed embodiments. The one or more processors 404 may run a standard operating system and perform standard operating system functions. It is recognized that any standard operating systems may be used such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 403 may include static RAM, dynamic RAM, flash memory, one or more flip-flops, ROM, CD-ROM, DVD, disk, tape, or magnetic, optical, or other computer storage medium. The memory 403 may include a plurality of program modules 410 and program data 420. The memory 403 may be local to the data validation system 400, as shown, or may be distributed and/or remote relative to the data validation system 400.

Data generated or used by the data validation system 400, such as by the program modules 410 or other modules, may be stored on the memory 403, for example, as stored program data 420. The program data 420 may be organized as one or more databases. The program data 420 may include Pick business object 422 and a corresponding microservice business object 424. The Pick business object 422 may comprise a business object obtained from a Pick database. The microservice business object 424 may include a business object obtained from a modern database system and correspond to the Pick business object 422.

The program modules 410 may run multiple operations concurrently or in parallel by or on the one or more processors 404. In some embodiments, portions of the disclosed modules, components, and/or facilities are embodied as executable instructions embodied in hardware or firmware, or stored on a non-transitory, machine-readable storage medium. The executable instructions may comprise computer program code that, when executed by a processor and/or computing device, causes a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to, circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems, and/or the like.

The program modules 410 may comprise a business read API 412, a reconcile service 414, and an updater 416. The business read API 412 may receive corresponding business objects from two disparate databases and convert the business objects into a common format. The reconcile service 414 may compare the two business objects to determine if there are discrepancies. If a discrepancy is found, the updater 416 may update the modern database based on the record of the legacy database.

The input/output interface 408 may facilitate user interaction with one or more input devices and/or one or more output devices. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software. For example, in one embodiment, the input/output interface 408 comprises a display to provide a graphical user interface (GUI) illustrating the potential ablation perimeters. The input/output interface 408 can receive user input data. In some embodiments, the input/output interface 408 is a touchscreen, and the size input is received via the touchscreen. In some embodiments, the input/output interface 408 can superimpose the target ablation perimeters on an image of the tissue.

The network interface 406 may facilitate communication with other computing devices and/or networks and/or other computing and/or communications networks. The network interface 406 may be equipped with conventional network connectivity such as, for example, Ethernet (IEEE 1102.3), Token Ring (IEEE 1102.5), Fiber Distributed Datalink Interface (FDDI), or Asynchronous Transfer Mode (ATM). Further, the network interface 406 may be configured to support a variety of network protocols such as, for example, IP, TCP, Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 409 may facilitate communication and/or interaction between the other components of the data validation system 400, including the one or more processors 404, the memory 403, the input/output interface 408, and the network interface 406.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

While specific embodiments of stents have been illustrated and described, it is to be understood that the disclosure provided is not limited to the precise configuration and components disclosed. Various modifications, changes, and variations apparent to those of skill in the art having the benefit of this disclosure may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill, having the benefit of this disclosure, in the art that changes may be made to the details of the above-described embodiments without departing from the underlying principles of the disclosure herein.

What is claimed is:

1. A method for validating data on disparate databases based on data stored on a Pick database, the method comprising:

operating, in parallel, the Pick database having a first database architecture and corresponding to a dealer management system, and a modern database having a second database architecture different from the first database structure and corresponding to a modern microservice;

retrieving Pick data having a first data architecture from the Pick database having the first database architecture, the Pick data comprising a Pick business object, the retrieving being in response to receiving an update to the Pick business object at the Pick database;

converting the Pick data into an external format, wherein converting the Pick data comprises extracting a plurality of raw data entries, determining identification tags to be associated with each of the plurality of raw data, and compiling the raw data and the identification tags into a data table in the external format;

converting the Pick data from the external format to a common format by filtering entries in the data table to obtain a filtered data set comprising information associated with the Pick business object and restructuring the filtered data set into the common format;

retrieving corresponding data having a second data architecture different from the first data architecture from the modern database having the second database architecture, the corresponding data comprising a microservice business object, the microservice business object comprising a copy of the Pick business object as stored on the modern database;

converting the corresponding data to the common format;

comparing the Pick data in the common format and comprising the Pick business object to the corresponding data in the common format and comprising the microservice business object, wherein the comparing is business object-type agnostic; and validating that the corresponding data and the Pick data are consistent by determining that the Pick business object and the microservice business object contain equivalent information, wherein if a data mismatch is determined between the Pick business object and the microservice business object, sending a comparison message to the modern database to update the microservice business object using a master copy of the Pick business object, the updating used to correct the corresponding data stored on the modern database.

2. The method of claim 1, wherein the common format is JSON and the external format is XML.

3. The method of claim 1, further comprising monitoring the Pick database for updates to a plurality of Pick business objects, including the update to the Pick business object.

4. The method of claim 3, wherein when the update occurs, a message with a key indicating which Pick business object the update is associated with is generated.

5. The method of claim 1, wherein the Pick business object comprises one of a customer business object, an employee business object, a vendor business object, and a financial institution business object.

6. The method of claim 1, wherein the Pick database is part of a centralized dealer management system.

7. The method of claim 1, wherein the modern database is a modern microservice architecture.

8. A non-transitory computer-readable storage medium, the computer-readable storage medium including instructions that when executed by a computer, cause the computer to:

retrieve Pick data having a first data architecture from a Pick database having a first database architecture, the Pick data comprising a Pick business object, wherein the Pick database corresponds to a dealer management system, and wherein the retrieving is in response to receiving an update to the Pick business object at the Pick database;

convert the Pick data into an external format, wherein converting the Pick data comprises extracting a plurality of raw data entries, determining identification tags to be associated with each of the plurality of raw data, and compiling the raw data and the identification tags into a data table in the external format;

convert the Pick data from the external format to a common format by filtering entries in the data table to obtain a filtered data set comprising information associated with the Pick business object and restructuring the filtered data set into the common format;

retrieve corresponding data having a second data architecture different from the first data architecture from a modern database having a second database architecture different from the first database architecture and corresponding to a modern microservice, the corresponding data comprising a microservice business object, wherein the Pick database and the microservice database operate in parallel, and wherein the microservice business object comprises a copy of the Pick business object as stored on the modern database;

convert the corresponding data to the common format;

compare the Pick data in the common format and comprising the Pick business object to the corresponding data in the common format and comparing the microservice business object, wherein the comparing is business object-type agnostic; and validate that the corresponding data and the Pick data are consistent by determining that the Pick business object and the microservice business object contain equivalent information, wherein if a data mismatch is determined between the Pick business object and the microservice business object, send a comparison message to the modern database to update the microservice business object using a master copy of the Pick business object, wherein the update to corrects the corresponding data stored on the modern database.

9. The non-transitory computer-readable storage medium of claim 8, wherein the common format is JSON and the external format is XML.

10. The non-transitory computer-readable storage medium of claim 8, wherein the instructions further configure the computer to monitor the Pick database for updates to a plurality of Pick business objects, including the update to the Pick business object.

11. The non-transitory computer-readable storage medium of claim 10, wherein when the update occurs, a message with a key indicating which Pick business object the update is associated with is generated.

12. The non-transitory computer-readable storage medium of claim 8, wherein the Pick business object comprises one of a customer business object, an employee business object, a vendor business object, and a financial institution business object.

13. The non-transitory computer-readable storage medium of claim 8, wherein the Pick database is part of a centralized dealer management system.

14. The non-transitory computer-readable storage medium of claim 8, wherein the modern database is a modern microservice architecture.

15. A computing apparatus comprising:

a processor; and a memory storing instructions that, when executed by the processor, configure the apparatus to:

retrieve Pick data having a first data architecture from a Pick database having a first database architecture, the Pick data comprising a Pick business object, wherein the Pick database corresponding to a dealer management service, and wherein the retrieving is in response to receiving an update to the Pick business object at the Pick database;

convert the Pick data into an external format, wherein converting the Pick data comprises extracting a plurality of raw data entries, determining identification tags to be associated with each of the plurality of raw data, and compiling the raw data and the identification tags into a data table in the external format;

convert the Pick data from the external format to a common format by filtering entries in the data table to obtain a filtered data set comprising information associated with the Pick business object and restructuring the filtered data set into the common format;

retrieve corresponding data having a second data architecture different from the first data architecture from a modern database having a second database architecture different from the first database architecture and corresponding to a modern microservice, the corresponding data comprising a microservice business object, wherein the Pick database and the microservice database operate in parallel, and wherein the microservice business object comprises a copy of the Pick business object as stored on the modern database;

convert the corresponding data to the common format;

compare the Pick data in the common format and comprising the Pick business object to the corresponding data in the common format and comparing the microservice business object, wherein the comparing is business object-type agnostic; and validate that the corresponding data and the Pick data are consistent by determining that the Pick business object and the microservice business object contain equivalent information, wherein if a data mismatch is determined between the Pick business object and the microservice business object, send a comparison message to the modern database to update the microservice business object using a master copy of the Pick business object, wherein the update to corrects the corresponding data stored on the modern database.

16. The computing apparatus of claim 15, wherein the common format is JSON and the external format is XML.

17. The computing apparatus of claim 15, wherein the instructions further configure the apparatus to monitor the Pick database for updates to a plurality of Pick business objects, including the update to the Pick business object.

18. The computing apparatus of claim 17, wherein when the update occurs, a message with a key indicating which Pick business object the update is associated with is generated.

19. The computing apparatus of claim 15, wherein the Pick business object comprises one of a customer business object, an employee business object, a vendor business object, and a financial institution business object.

20. The computing apparatus of claim 15, wherein the Pick database is part of a centralized dealer management system and the modern database is a modern microservice architecture.

* * * * *